US009858715B2

(12) United States Patent
Mason

(10) Patent No.: US 9,858,715 B2
(45) Date of Patent: Jan. 2, 2018

(54) TRANSFORMING POLYGONAL MESH BY SUB-POLYCHORD COLLAPSE

(71) Applicant: Electronic Arts Inc., Redwood City, CA (US)

(72) Inventor: Ashton Mason, Twickenham (GB)

(73) Assignee: Electronic Arts Inc., Redwood City, CA (US)

( * ) Notice: Subject to any disclaimer, the term of this patent is extended or adjusted under 35 U.S.C. 154(b) by 159 days.

(21) Appl. No.: 14/823,480

(22) Filed: Aug. 11, 2015

(65) Prior Publication Data

US 2017/0046874 A1    Feb. 16, 2017

(51) Int. Cl.
*G06T 15/08* (2011.01)
*G06T 17/20* (2006.01)

(52) U.S. Cl.
CPC .................. *G06T 17/205* (2013.01)

(58) Field of Classification Search
None
See application file for complete search history.

(56) References Cited

U.S. PATENT DOCUMENTS

| 8,698,809 | B2 | 4/2014 | Hamedi et al. |
| 8,860,723 | B2 | 10/2014 | Johansson et al. |
| 2013/0300734 | A1* | 11/2013 | Schmidt ................. G06T 19/20 345/419 |
| 2014/0111510 | A1 | 4/2014 | Lindahl et al. |
| 2014/0160121 | A1 | 6/2014 | Johansson et al. |
| 2014/0198103 | A1 | 7/2014 | Johansson et al. |

FOREIGN PATENT DOCUMENTS

| EP | 2909813 A1 | 8/2015 |
| WO | 2014086925 A1 | 6/2014 |
| WO | 2014111221 A3 | 7/2014 |

(Continued)

OTHER PUBLICATIONS

Daniels, J., Silva, C., Shepherd, J., Cohen, E., Quadrilateral Mesh Simplification, Dec. 2008, ACM Transactions on Graphics, vol. 27, pp. 1-9.*

(Continued)

*Primary Examiner* — Said Broome
(74) *Attorney, Agent, or Firm* — Lowenstein Sandler LLP

(57) ABSTRACT

An example method of transforming polygonal meshes by sub-polychord collapse may include identifying, among a plurality of sub-polychords of a given size, a seed sub-polychord having an optimal value of a metric associated with collapsing the respective sub-polychord. The example method may further include identifying a first test value of the metric for a first test sub-polychord comprising the seed sub-polychord and a first adjacent edge, and further identifying a second test value of the metric for a second test sub-polychord comprising the seed sub-polychord and a second adjacent edge. The example method may further include, responsive to determining a minimum of the first test value of the metric and the second test value of the metrics is less than a base value of the metric for the seed sub-polychord, transforming the seed sub-polychord by adding an adjacent edge that produces a test sub-polychord having the minimum test value.

20 Claims, 10 Drawing Sheets

(56) References Cited

FOREIGN PATENT DOCUMENTS

| WO | 2009096891 A1 | 8/2014 |
|----|---------------|--------|
| WO | 2014060585 A1 | 8/2015 |
| WO | 2016005147 A1 | 1/2016 |

OTHER PUBLICATIONS

Daniels, Joel et al., "Quadrilateral Mesh Simplification", University of Utah, 9 pages http://www.sci.utah.edu/~csilva/papers/siggraph-asia2008.pdf (Last accessed Aug. 11, 2015).
Garland, Michael et al., "Surface Simplification Using Quadric Error Metrics", Carnegie Mellon University, 8 pages http://www.cs.cmu.edu/~/garland/Papers/quadrics.pdf (Last accessed Aug. 11, 2015).
Tarini, Marco et al., "Practical Quad Mesh Simplification", Eurographics 2010, vol. 29, No. 2, 2010, 12 pages.

* cited by examiner

TRANSFORMING POLYGONAL MESH BY SUB-POLYCHORD COLLAPSE

TECHNICAL FIELD

The present disclosure is generally related to computer-generated video content, and is more specifically related to transforming polygonal meshes by sub-polychord collapse.

BACKGROUND

A polygonal mesh may be represented by a collection of vertices, edges, and faces that define the shape and/or boundaries of a three-dimensional object. An edge may be represented by a line connecting two vertices. A vertex may be represented by a point having a certain spatial position. Mesh faces may be represented by various polygonal shapes such as triangles, quads (quadrangles), and/or other regular or irregular polygons. In various illustrative examples, a triangular face may be formed with a closed set of three edges, a quadrilateral face may be formed with a closed set of four edges, etc.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for transforming polygonal meshes by sub-polychord collapse. Such methods and systems may be employed for mesh simplification, i.e., creation of simplified versions of mesh models. In the context of creating computer-generated imagery, mesh simplification is known as Level of Detail (LOD) generation. LOD generation may be employed for generating a simplified version of an original model of an object that may be represented by an artist-authored model of a computer game character. Simplified versions of the original model may be employed to simulate views at the modeled object from various distances. Methods and systems for transforming polygonal meshes by sub-polychord collapse may also be employed for various other image processing tasks, including but not limited to several examples provided herein below.

Figure 1:
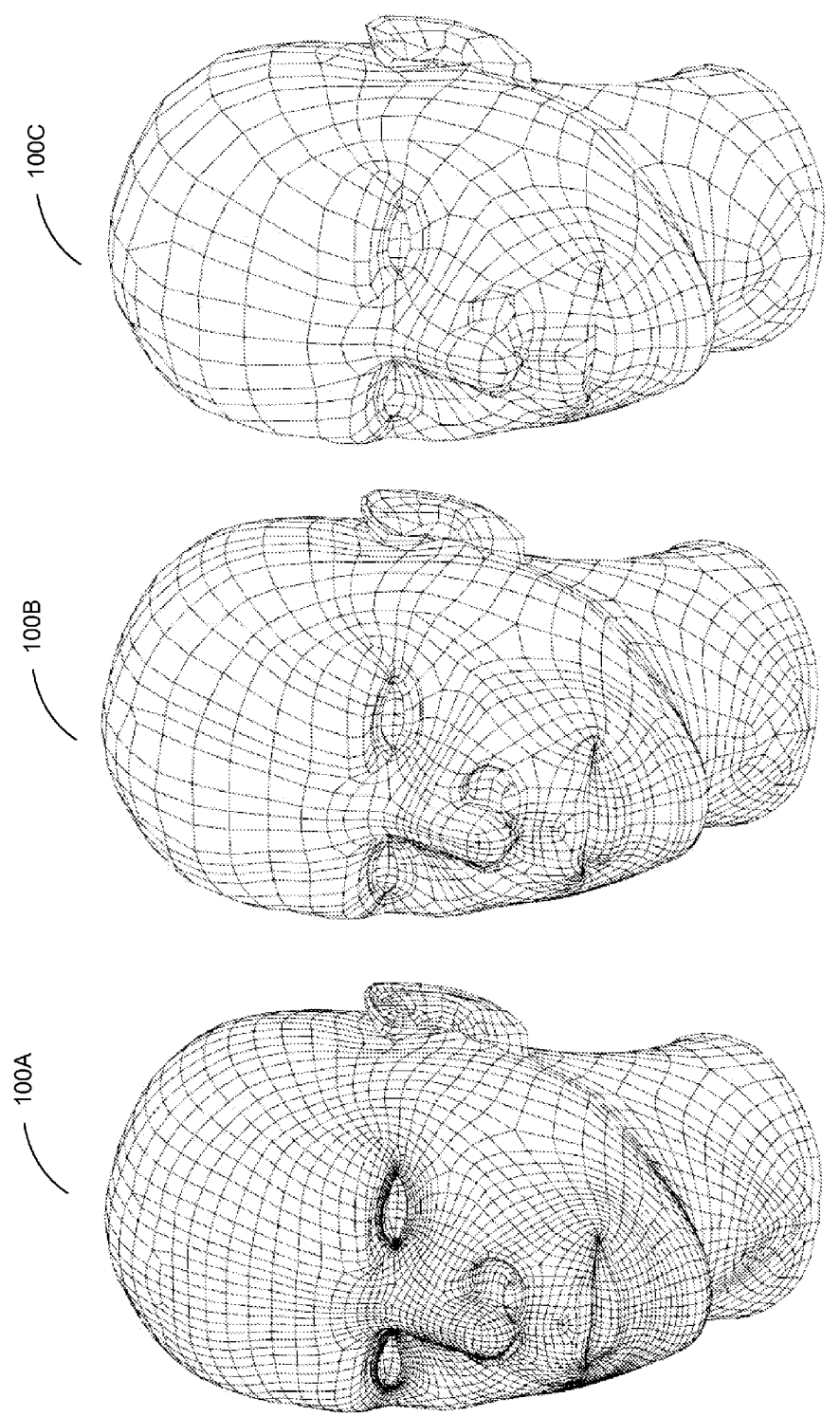
FIG. 1 schematically illustrates examples of mesh model simplification using methods and systems for transforming polygonal meshes by sub-polychord collapse, in accordance with one or more aspects of the present disclosure.

Examples of mesh simplification are shown in FIG. 1, which illustrates an original quad mesh 100A and simplified meshes 100B and 100C that have been produced using methods and systems for transforming polygonal meshes by sub-polychord collapse described herein.

In conventional implementations, LOD generation may be performed by employing both artist-authoring and software tools. Systems and methods of the present disclosure provide for fully-automated LOD generation by collapsing sub-polychords in a quad mesh.

"Quad mesh" herein shall refer to a polygonal mesh, in which at least some of the faces are represented by four-sided polygons, also referred to as quads or quadrangles.

"Mesh fidelity" herein shall refer to a metric of the quality of representation of the original object by the mesh, e.g., a function quantifying the deviation of curved edges of the original object from linear edges of the mesh.

Figure 2:
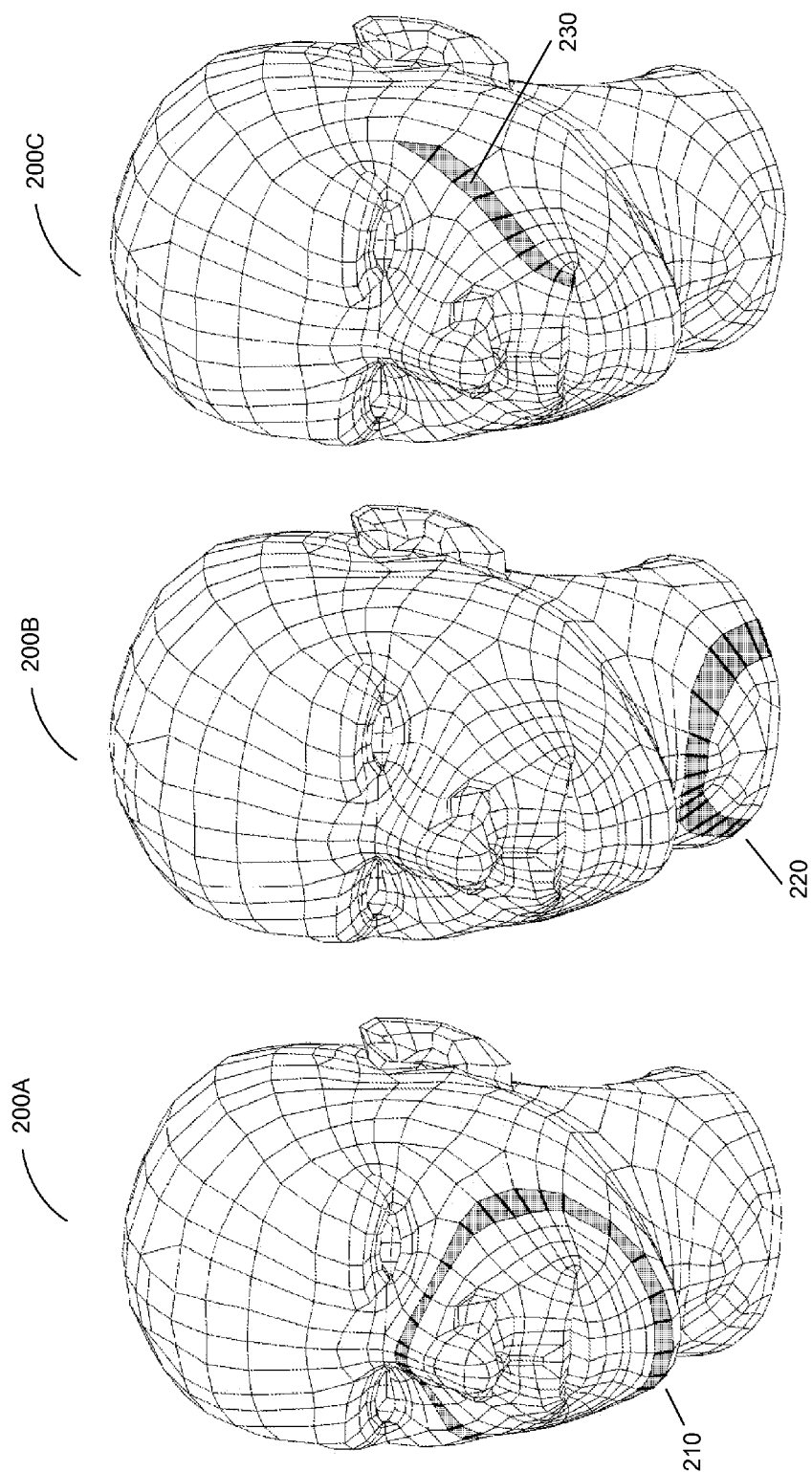
FIG. 2 schematically illustrates examples of polychords in quad meshes.

"Polychord" herein shall refer to a sequence of mesh edges that connect a series of quads, such that a pair of successive edges in the sequence represent opposite edges of a single quad. Alternatively, a polychord may be defined as a set of chords in a dual graph representation of a mesh. The dual graph representation may be constructed by placing a node at every face of the mesh and connecting the nodes by chords that are perpendicular to the mesh edges. As schematically illustrated by FIG. 2, a quad strip corresponding to a polychord may either be looped (e.g., polychord 210 in mesh rendering 200A), or may terminate at boundary edges (e.g., polychord 220 in mesh rendering 200B) or may terminate by non-quad faces, such as triangles (e.g., polychord 230 in mesh rendering 200C).

Figure 3:
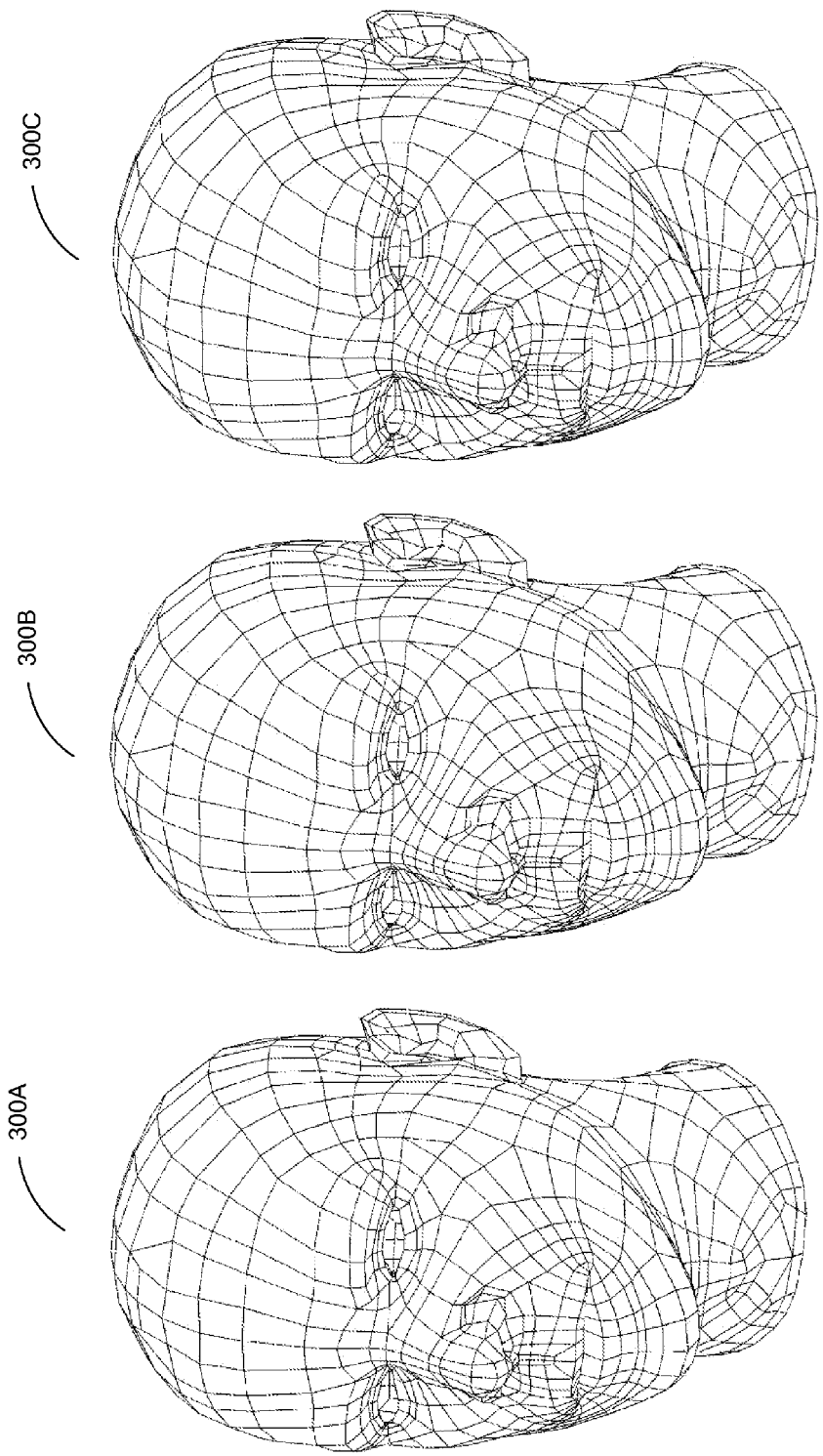
FIG. 3 schematically illustrates quad meshes of FIG. 2 after collapsing the respective highlighted polychords.

Mesh simplification may involve iteratively performing several polychord collapse operations. A polychord collapse operation may be performed by replacing each of the polychord edges with a single vertex. As all edges in a polychord are collapsed in a single atomic operation, the entire sequence of quads is collapsed to a sequence of edges. Hence, collapsing a polychord may have the visual effect of removing the entire corresponding quad strip, as schematically illustrated by FIG. 3, in which meshes 300A, 300B, and 300C represent the results of collapsing polychords 210, 220, and 230 in respective mesh renderings 200A, 200B, and 200C of FIG. 2.

In certain implementations, a polychord may be selected for being collapsed by evaluating a cost metric that estimates the net loss of mesh fidelity that would result from collapsing the polychord. Alternatively, a polychord may be selected for being collapsed by evaluating a criterion that is represented by the ratio of the benefit of collapsing the polychord to the cost of collapsing the polychord. The benefit of collapsing the polychord may be represented by the number of the edges or vertices that would be removed from the mesh by the collapse operation.

Figure 4:
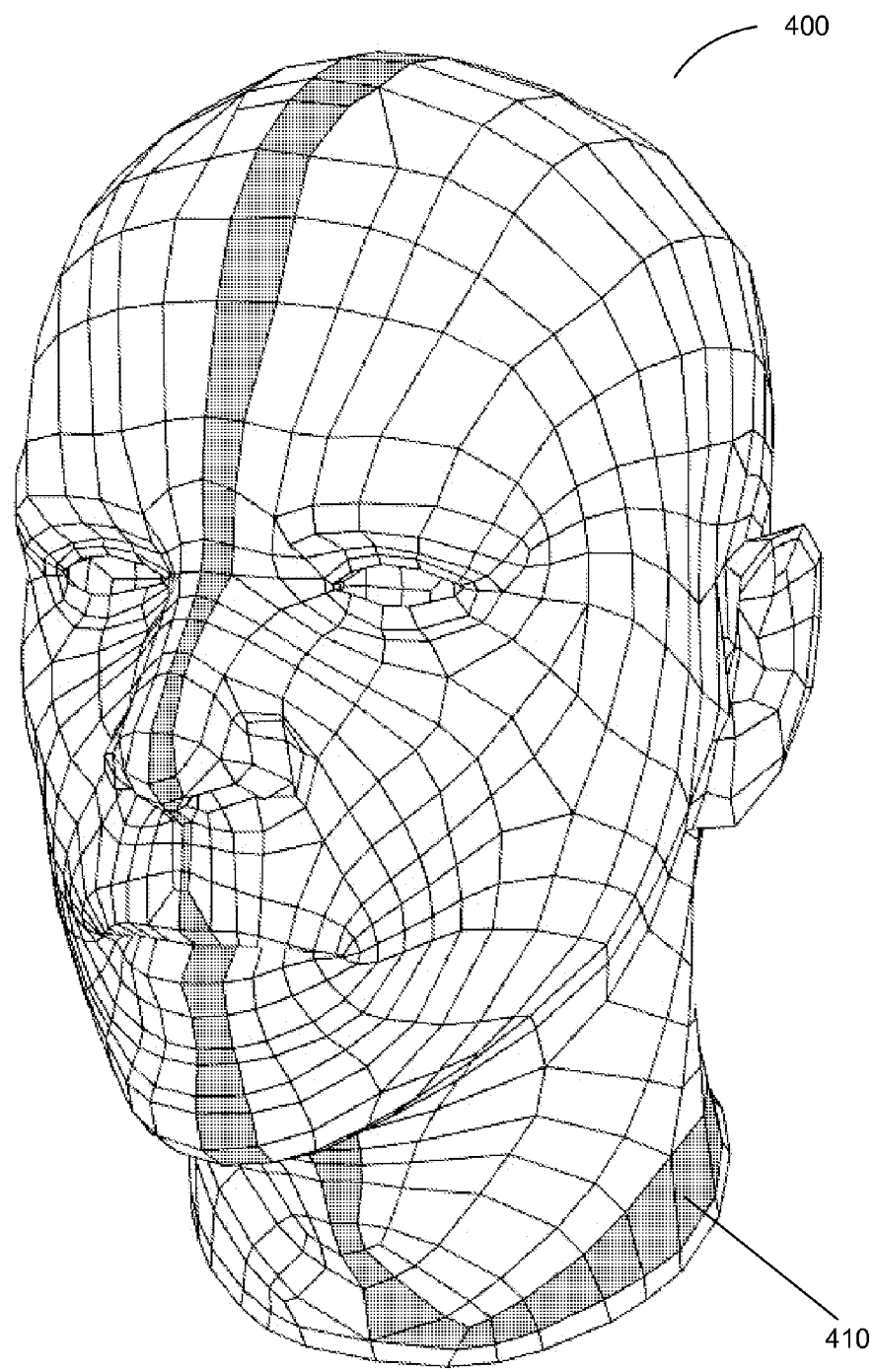
FIG. 4 schematically illustrates a mesh in which a single polychord connects more detailed and less detailed areas of the mesh.

Collapsing a polychord may, for some meshes, substantially degrade the mesh fidelity, as schematically illustrated by FIG. 4. Collapsing polychord 410 would produce a resulting mesh with a significantly lower mesh fidelity, since polychord 410 connects more detailed and less detailed areas of mesh 400.

In accordance with one or more aspects of the present disclosure, one or more collapse operations may be performed with respect to a part of a polychord, also referred to as a sub-polychord. Collapsing a sub-polychord may be viewed as collapsing a portion of a larger polychord. While inner quads of a sub-polychord may be collapsed to edges, the quads at the ends of the sub-polychord may be collapsed to triangles.

Figure 5:
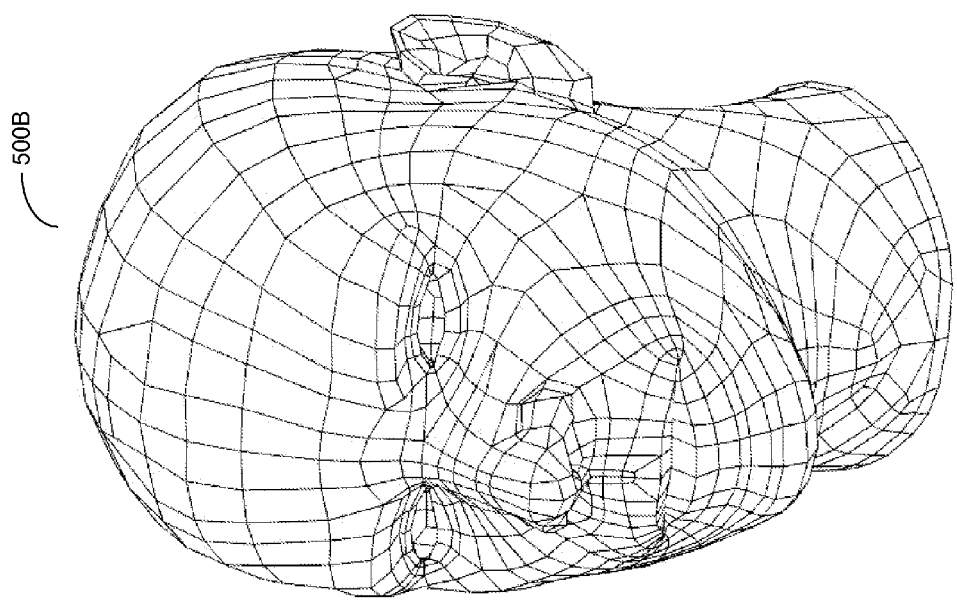
FIG. 5 schematically illustrates an example of collapsing a sub-polychord in a mesh, in accordance with one or more aspects of the present disclosure.
Figure 5:
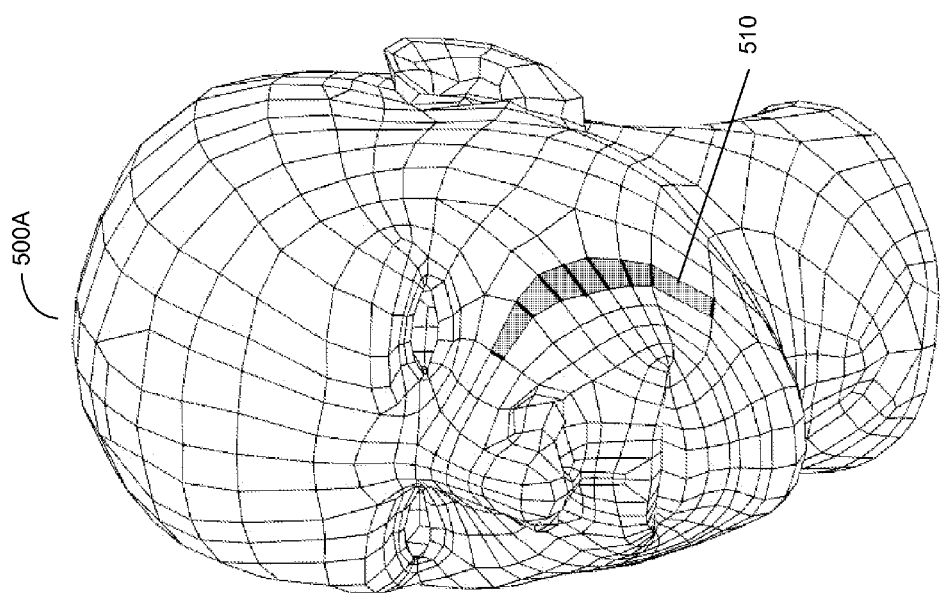

FIG. 5 schematically illustrates an example of collapsing sub-polychord 510 in mesh 500A. Mesh 500B represents the resulting mesh after performing the sub-polychord collapsing operation.

Figure 6:
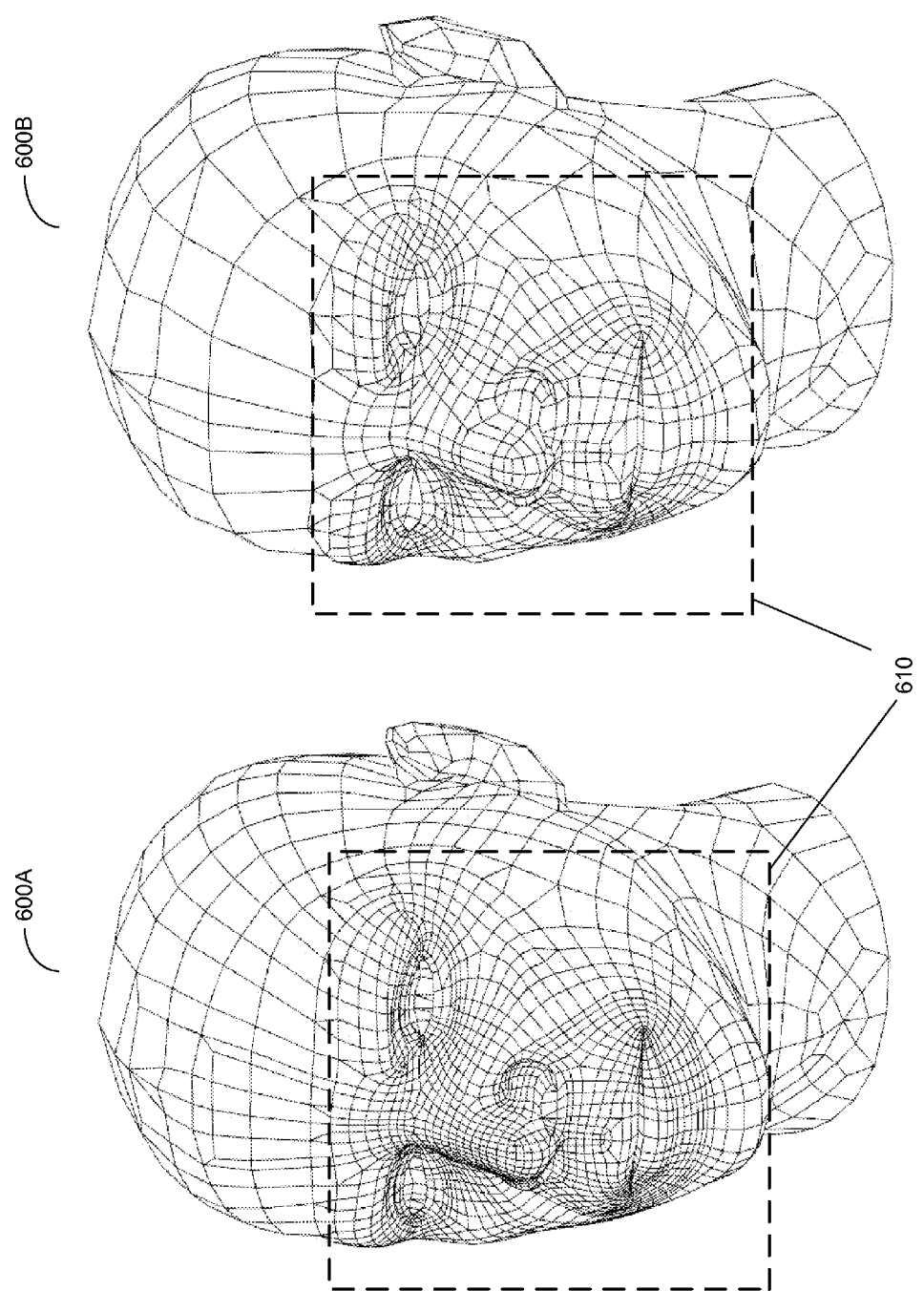
FIG. 6 schematically illustrates altering the mesh topology by collapsing one or more sub-polychords to meet local detailization requirements, in accordance with one or more aspects of the present disclosure.

Sub-polychord collapsing allows altering the mesh topology by performing independent simplification of different areas of the mesh in order to meet local detailization requirements, as schematically illustrated by FIG. 6. Meshes 600A, 600B represent simplified versions of the original mesh 100A of FIG. 1, where area 610 was identified as having higher detailization requirements than other areas. In certain implementations, one or more mesh areas for simplification may be identified by the artist who authored the original mesh. Alternatively, one or more mesh areas for simplification may be automatically identified by a system operating in accordance with one or more aspect of the present disclosure.

In an illustrative example, sub-polychord collapsing may be employed for producing simplified meshes that selectively retain more details in the areas where deformation needs to be supported (e.g., for skinned mesh animation). "Skinned mesh" herein refers to a mesh having a frame or "bone" hierarchy, according to which mesh vertices can be rendered at various positions in space to simulate character movement, such as running, waving, etc.

In another illustrative example, sub-polychord collapsing may be employed for producing simplified meshes that selectively retain more details in the areas, the fidelity of which is identified as being particularly important for defining the model silhouette.

Furthermore, sub-polychord collapse methods described herein allow collapsing multiple sub-polychords in a single operation, by treating such sub-polychords as single generalized polychords, or arbitrary sets of edges. This allows preserving the symmetry of symmetric meshes by processing both sides of the axis of symmetry by similar collapse operations. Alternatively, sub-polychord collapsing may be employed for selective asymmetric simplification of a symmetric mesh, by collapsing only a part of a symmetric polychord that spans both sides of an axis of symmetry of the model.

Sub-polychord collapse methods described herein may also be employed in situations where several related meshes have the same topology, but different geometry (such as blend shapes or morph targets utilized in computer animation), should be collapsed in tandem, and identically, so that the resulting simplified meshes would still have matching topologies. This can be achieved by treating the collection of meshes as sub-meshes within a single mesh and collapsing generalized polychords that contain corresponding sub-polychords from each sub-mesh.

Sub-polychord collapse methods described herein may also be employed in situations where parts of a multi-part mesh, or sub-meshes, should be collapsed in such a way that the joins, or interfaces, between the parts are simplified consistently. This can be achieved by collapsing the corresponding sub-polychords at the interfaces. The sets of corresponding sub-polychords effectively form generalized polychords that spread across the sub-meshes.

However, collapsing one or more sub-polychords may introduce singular vertices and non-quad faces, and thus may lead to a significant degradation of the mesh fidelity. In various applications, such mesh fidelity degradation can be tolerated and/or managed by employing appropriate candidate sub-polychords selection criteria that would balance various requirements to the resulting mesh.

In accordance with one or more aspects of the present disclosure, a sub-polychord to be collapsed may be selected by evaluating one or more selection criteria. Such selection criteria may be based on the collapse benefit (e.g., net loss of the mesh edge count or mesh vertex count) and/or the collapse cost (e.g., degradation of the mesh fidelity). In an illustrative example, the selection criterion may be represented by the ratio of the benefit of collapsing the polychord to the cost of collapsing the polychord. In various implementations, the cost metric may comprise several independent terms, including specialized terms tailored to penalize degradation of application-specific aspects of mesh fidelity, as described in more details herein below.

In an illustrative example, the sub-polychord for collapse may be identified by an exhaustive (brute force) search, i.e. by calculating the values of the chosen polychord selection criterion for all candidate sub-polychords and then selecting for collapse the sub-polychord having the optimal (i.e., minimal or maximal) value of the polychord selection criterion. However, as the number of possible sub-polychords that can be defined within a given polychord is proportional to the square of the number of the edges of the original polychord, identifying the optimal sub-polychord for collapse in a mesh composed of N polychords by a brute force search would have a computational complexity proportional to $N*M^2$, where M is the average number of edges per polychord. The present disclosure addresses the above-noted computational complexity issue by describing heuristics search methods having the computational complexity proportional to $N*M$.

In an illustrative example, a method of identifying a sub-polychord for collapsing comprises two phases. In the first phase, a seed sub-polychord is identified as a sub-polychord of a fixed size (e.g., expressed by the number of edges) comprising the cheapest, in terms of the selected cost metric, edges of a given polychord. In certain implementations, the seed sub-polychord having the lowest cost per edge may be identified by evaluating all possible contiguous sub-polychords of the specified size, with a computational complexity proportional to the number of edges in the original polychord.

In the second phase, the candidate sub-polychord, that is originally represented by the identified seed polychord, is transformed by iteratively adding edges to the candidate sub-polychord. The edge to be added to the candidate sub-polychord may be selected from the polychord edges adjacent to the edges of the candidate sub-polychord. At every iteration, possible new sub-polychords are formed by adding each of the respective adjacent edges, and the sub-polychord having the lowest per-edge cost is selected as the new candidate sub-polychord if the average per-edge cost of the new sub-polychord is less than the per-edge cost of the current candidate sub-polychord. The second phase, also referred to as seed growing phase, is terminated when all possible edge adding operations fail to produce a new sub-polychord having the average per-edge cost less than the per-edge cost of the current candidate sub-polychord, as described in more details herein with reference to FIG. 9.

As the maximum number of edges that may be added to the seed sub-polychord is limited by the size of the polychord, the second phase, like the first phase, has the computational complexity proportional to the number of edges in the original polychord. Thus, the overall computational complexity of the heuristic search method is proportional to N*M.

Figure 7:
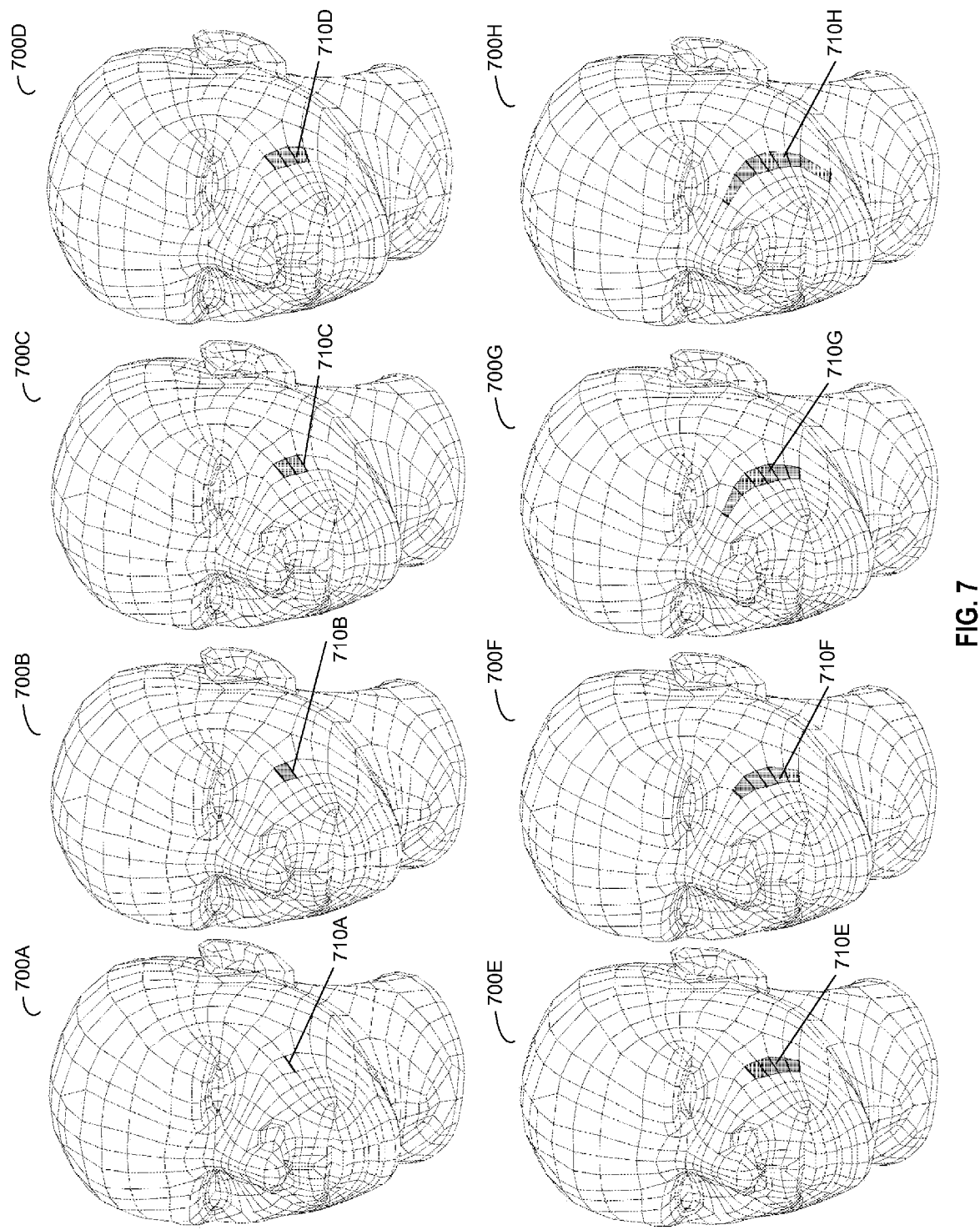
FIG. 7 schematically illustrates several iterations of an example method of identifying a candidate sub-polychord for collapse, in accordance with one or more aspects of the present disclosure.

FIG. 7 schematically illustrates several iterations of an example method of identifying a sub-polychord for collapse, in accordance with one or more aspects of the present disclosure. Seed sub-polychord 710A shown in mesh rendering 700A is initially identified as having the lowest, in terms of the selected cost metric, per-edge cost among the sub-polychords having the size of one edge. Mesh renderings 700B-700H illustrate the subsequent iterations of the method, in which the candidate sub-polychord 710B-710G is transformed by adding, at every iteration, the lowest cost edge among two edges adjacent to the current candidate sub-polychord. The seed growing phase is terminated when all possible edge adding operations fail to produce a new sub-polychord having the average per-edge cost less than the per-edge cost of the current candidate sub-polychord, thus identifying polychord 710H for collapse.

While FIG. 7 schematically illustrates the initial seed sub-polychord of the size of one edge, in other illustrative examples, various other sizes of the initial seed sub-polychord may be chosen.

While FIG. 7 schematically illustrates a method of growing a single candidate sub-polychord, in other illustrative examples, two or more initial seed sub-polychords may be identified. Each of the seed sub-polychords may be grown using the above described sub-polychord growing method, and then the sub-polychord having the lowest per-edge cost may be selected among the resulting candidate sub-polychords.

While FIG. 7 schematically illustrates a method of growing a candidate sub-polychord by iteratively adding edges, in other implementations, sub-polychord shrinking iterations may also be employed. In an illustrative example, if all possible edge adding operations fail to produce a new sub-polychord having the average per-edge cost less than the per-edge cost of the current candidate sub-polychord, the current candidate sub-polychord may be shrunk by removing an outer edge having the highest per-edge cost among the two outer edges, and the method may continue by performing a sub-polychord growing iteration.

In certain implementations, the method of identifying a sub-polychord for collapse may employ a quadric error cost metric to prioritize candidate polychord collapses. The quadric error metric measures the degree of deterioration, due to the sub-polychord collapse, of the ability of the mesh to represent the original geometry. In certain implementations, a quadric error value can be computed for a proposed single vertex representing the collapse of an edge, where the error value is computed using the sum of the quadrics of the two edge vertices, so that the sum reflects the local change of mesh topology around the two vertices. Similarly, the quadric error values of the vertices belonging to the edges collapsed by a generalized edge collapse may be summed. "Generalized edge collapse" herein refers to the atomic collapse of multiple connected edges to a single vertex. The resulting quadric error value reflects the effect of the whole generalized edge collapse upon the mesh topology. In certain implementations, the quadric error metric values associated with individual vertices may be weighted by the area of the associated faces or by the linear size of the associated edges.

In certain implementations, the method of identifying a sub-polychord for collapse may employ a compound cost metric. In an illustrative example, such a cost metric may comprise two or more weighted terms. Each term may be designed to reflect the effect of the sub-polychord collapse operation upon a specific aspect of mesh fidelity:

$$C = W_q * C_q + W_v * C_v + W_z * C_z$$

The metric may be defined within a unified space in which all terms are expressed as distances, making possible the direct linear weighted combination of independent terms. The W coefficients represent the weights, which may be pre-defined or user-configurable.

In the compound metric C, the quadric error term $C_q$ measures the degree to which the sub-polychord collapse would deteriorate the ability of the mesh to represent the original geometry, as described in more details herein above.

The $C_v$ term reflects a valence cost that penalizes collapses that make the mesh more irregular. A penalty score for a candidate polychord collapse may be computed, and then multiplied by a representative constant length (e.g., the mean edge length) in order to make it compatible with the overall cost metric framework, in which all cost terms are expressed as distances.

The valence penalty score may be computed as two separate components reflecting, respectively, negative changes in the vertex valence (i.e., the number of faces incident to the vertex) and negative changes in the face valence (i.e., the number of vertices in each face, equivalent to the valence of the corresponding vertex in the dual graph of the mesh). The ideal valence for both vertices and faces is assumed to be four, matching the structure of a regular quad mesh. Collapses which move the valence of a vertex or face away from four are penalized according to the increase in disparity. On the other hand, collapses that move the valence of a vertex or face toward four are neither penalized nor rewarded.

To compute the vertex valence penalty component, the current valence of each vertex prior to collapse may be compared to the predicted valence of the same vertex after collapse (taking into account any vertex welding). The maximum valence disparity of all the vertices that map to a given welded vertex prior to collapse may then be computed and compared to the predicted valence of the welded vertex after collapse. Cost penalties are thus imposed for any welded vertices whose maximum valence disparity increases.

To compute the vertex valence penalty component, the current valence value (i.e., vertex count) of each face prior to collapse may be compared to the predicted valence of the face after collapse (again, taking into account any vertex welding). Cost penalties are thus imposed for any faces whose valence disparity increases.

The $C_z$ term reflects one or more additional aspects reflecting the specific qualities of the meshes, such as mesh symmetry, mesh silhouette, etc.

The methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

Figure 8:
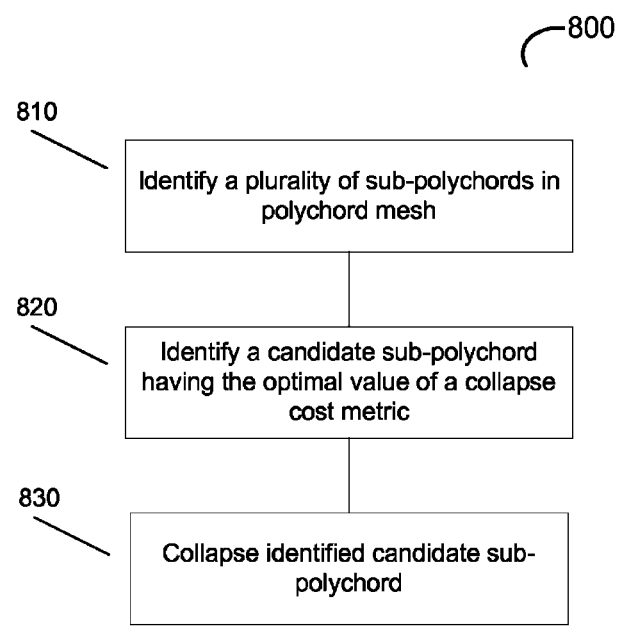
FIG. 8 depicts a flow diagram of an example method of transforming polygonal meshes by sub-polychord collapse, in accordance with one or more aspects of the present disclosure.

FIG. 8 depicts a flow diagram of an example method 800 for transforming polygonal meshes by sub-polychord collapse in accordance with one or more aspects of the present disclosure. Method 800 and/or each of its individual functions, routines, subroutines, or operations may be performed by one or more general purpose and/or specialized processing devices. Two or more functions, routines, subroutines, or operations of method 800 may be performed in parallel or in an order which may differ from the order described above. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. In an illustrative example, method 800 may be performed by computing device 1000 described herein below with references to FIG. 10.

At block 810, a processing device implementing the method may identify a plurality of sub-polychords in a polychord mesh comprising one or more polychords. In certain implementations, at least one sub-polychord of the plurality of sub-polychords may comprise a contiguous sequence of edges of a corresponding polychord. In certain implementations, at least one sub-polychord of the plurality of sub-polychords may comprise an arbitrary set of edges of the original polychord mesh, as described in more details herein above.

At block 820, the processing device may identify, among the plurality of sub-polychords, a candidate sub-polychord having the optimal value of a metric associated with collapsing the respective sub-polychord. In certain implementations, the metric may represent a cost of collapsing the sub-polychord (i.e., loss of mesh fidelity caused by collapsing the sub-polychord). Alternatively, the metric may represent the ratio of the benefit of collapsing the candidate sub-polychord to the cost of collapsing the candidate sub-polychord. The benefit of collapsing the candidate sub-polychord may reflect the number of edges or vertices to be removed from the polychord mesh by collapsing the candidate sub-polychord. In certain implementations, the metric may comprise a weighted sum of two or more terms. A term of the metric may be provided by a quadric error term that measures the degree of deterioration, due to the candidate sub-polychord collapse, of the ability of the mesh to represent the original geometry. Additionally or alternatively, a term of the metric may be provided by a valence term reflecting the change of the vertex or face valence, as described in more details herein above.

In certain implementations, the candidate sub-polychord may be identified by an exhaustive (brute force) search, i.e. by calculating the values of the chosen polychord selection criterion for all candidate sub-polychords and then selecting for collapse the sub-polychord having the optimal (i.e., minimal or maximal) value of the polychord selection criterion. Alternatively, the candidate sub-polychord may be identified by a heuristic search method, e.g., by search method 900, which is described with reference to FIG. 9 herein below.

At block 830, the processing device may collapse the candidate sub-polychord. Collapsing the candidate sub-polychord may comprise replacing a set of edges comprised by the candidate sub-polychord with a set of vertices. In various illustrative examples, collapsing the candidate sub-polychord may further comprise replacing the quads at the ends of the sub-polychord with triangles, as described in more details herein above. Responsive to completing operations described with respect to block 830, the method may terminate.

Figure 9:
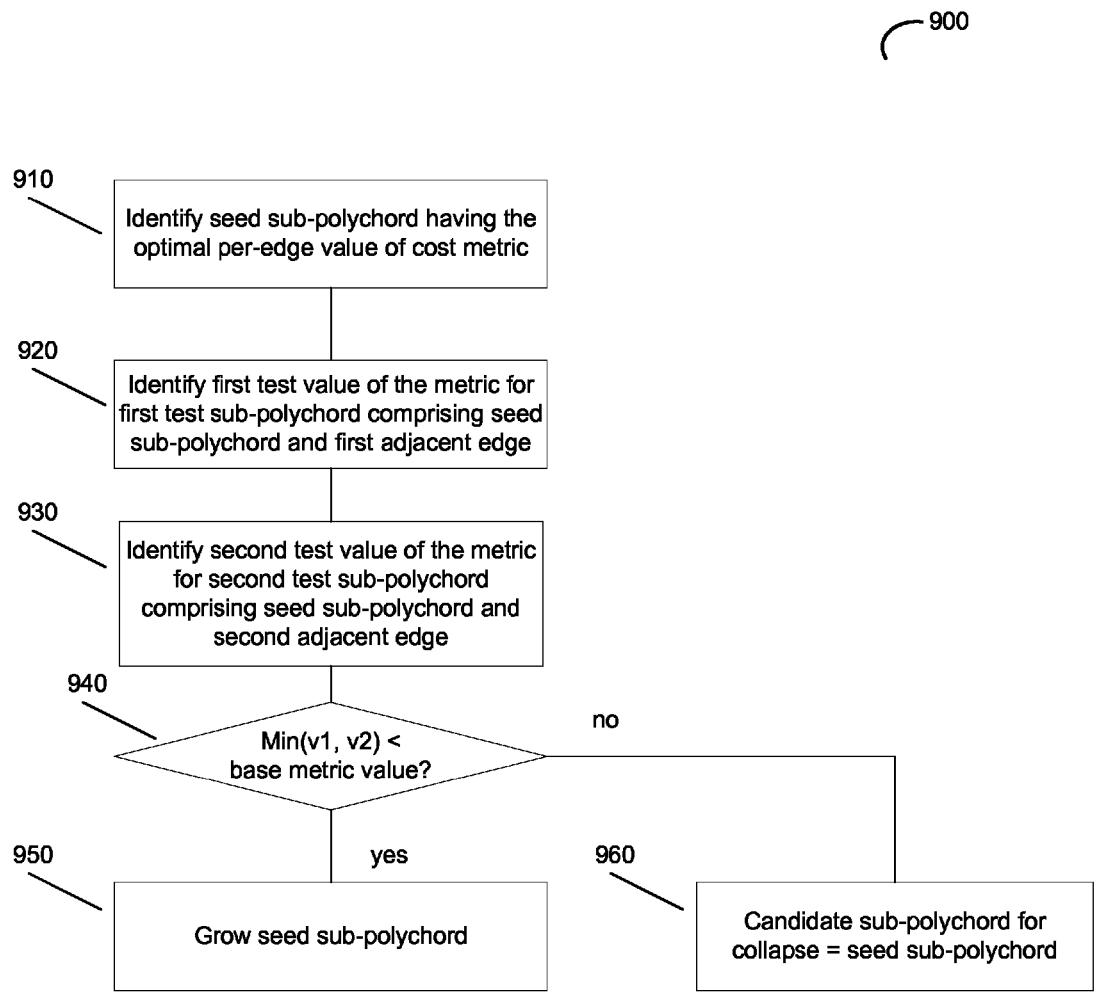
FIG. 9 schematically illustrates a flowchart of an example method of identifying a candidate sub-polychord for collapse, in accordance with one or more aspects of the present disclosure.

FIG. 9 depicts a flow diagram of an example method 900 for identifying a candidate sub-polychord for collapse in accordance with one or more aspects of the present disclosure. Method 900 and/or each of its individual functions, routines, subroutines, or operations may be performed by one or more general purpose and/or specialized processing devices. Two or more functions, routines, subroutines, or operations of method 900 may be performed in parallel or in an order which may differ from the order described above. In certain implementations, method 900 may be performed by a single processing thread. Alternatively, method 900 may be performed by two or more processing threads, each thread executing one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other. In an illustrative example, method 900 may be performed by computing device 1000 described herein below with references to FIG. 10.

At block 910, a processing device implementing the method may identify a seed sub-polychord having the optimal (e.g., minimal) per-edge value of the chosen cost metric among the plurality of sub-polychords of a given size.

At block 920, the processing device may identify the first test value of the metric for the first test sub-polychord comprising the seed sub-polychord and the first adjacent edge.

At block 930, the processing device may identify the second test value of the metric for the second test sub-polychord comprising the seed sub-polychord and the second adjacent edge.

Responsive to determining, at block 940, that the minimum of the first test value of the metric and the second value of the metrics is less than the base value of the metric corresponding to the seed sub-polychord, the processing device may, at block 950, transform the seed sub-polychord by adding the adjacent edge producing the sub-polychord having the minimal test value of the metric. The seed sub-polychord growing may be performed iteratively, until determining that the minimum of the first value of the metric and the second value of the metric exceeds the base value of the metric.

Responsive to determining, at block 940, that the minimum of the first value of the metric and the second value of the metric exceeds the base value of the metric, the processing device may, at block 960, identify the candidate sub-polychord for collapse as being equal to the seed sub-polychord. Responsive to completing operations described with respect to block 960, the method may terminate.

Figure 10:
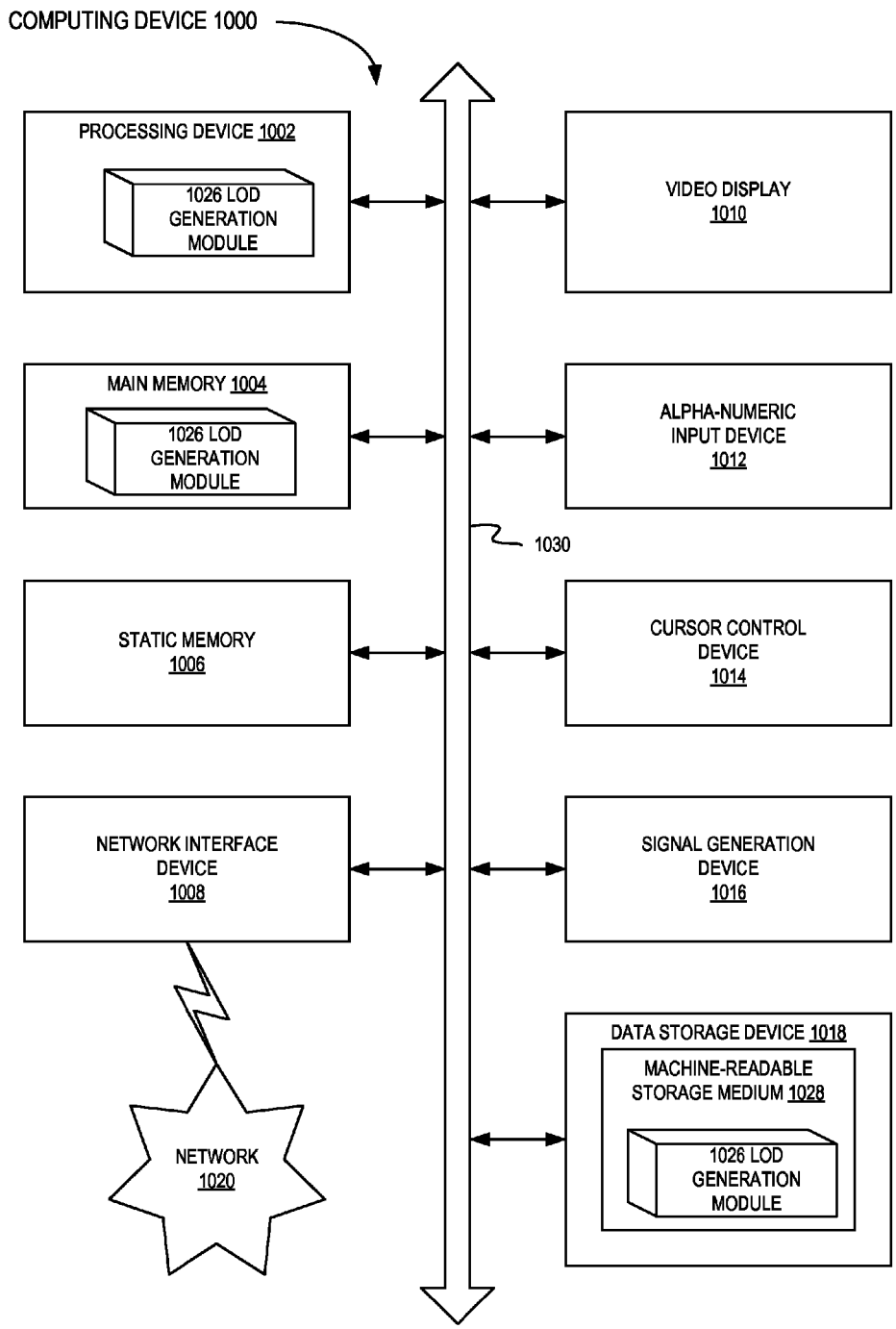
FIG. 10 depicts a block diagram of an illustrative computing device operating in accordance with one or more aspects of the present disclosure.

FIG. 10 illustrates a diagrammatic representation of a computing device 1000 within which a set of instructions, for causing the computing device to perform the methods discussed herein, may be executed. Computing device 1000 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute LOD generation module 1026 implementing methods 800 and/or 900 for transforming polygonal meshes by sub-polychord collapse, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions (e.g., instructions of LOD generation module 1026 implementing methods 800 and/or 900 for transforming polygonal meshes by sub-polychord collapse) implementing any one or more of the methods or functions described herein. Instructions implementing LOD generation module 1026 may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    identifying, among a plurality of sub-polychords of a given size in a polychord mesh, a seed sub-polychord having a minimal value of a metric associated with collapsing the respective sub-polychord;
    identifying, by a processing device, a first test value of the metric for a first test sub-polychord comprising the seed sub-polychord and a first adjacent edge;
    identifying a second test value of the metric for a second test sub-polychord comprising the seed sub-polychord and a second adjacent edge;
    responsive to determining that a minimum of the first test value of the metric and the second test value of the metrics is less than a base value of the metric for the seed sub-polychord, transforming the seed sub-polychord by adding an adjacent edge that produces a test sub-polychord having the minimum test value; and
    utilizing the polychord mesh for creating computer-generated imagery.

2. The method of claim 1, wherein transforming the seed sub-polychord is performed iteratively, until determining that the minimum of the first value of the metric and the second value of the metric exceeds the base value of the metric.

3. The method of claim 1, wherein a sub-polychord of the plurality of sub-polychords comprises one of: a contiguous sequence of edges of a corresponding polychord or an arbitrary set of edges of the polychord mesh.

4. The method of claim 1, further comprising:
responsive to determining that the minimum of the first value of the metric and the second value of the metric exceeds the base value of the metric, collapsing the seed sub-polychord.

5. The method of claim 1, wherein collapsing the seed sub-polychord comprises at least one of: replacing a set of edges comprised by the seed sub-polychord with a set of vertices or replacing a quadrangle face at an end of the seed sub-polychord with a triangle.

6. A method, comprising:
identifying, by a processing device, a plurality of sub-polychords in a polychord mesh comprising one or more polychords;
identifying, among the plurality of sub-polychords, a candidate sub-polychord having an optimal value of a metric associated with collapsing the respective sub-polychord, wherein the optimal value is provided by one of: a maximal value of the metric among a plurality of values of the metric associated with the plurality of sub-polychords or a minimal value of the metric among the plurality of values of the metric associated with the plurality of sub-polychords;
collapsing the candidate sub-polychord by replacing a set of edges comprised by the candidate sub-polychord with a set of vertices, wherein collapsing the candidate sub-polychord further comprises replacing a quadrangle face at an end of the sub-polychord with a triangle; and
utilizing the polychord mesh for creating computer-generated imagery.

7. The method of claim 6, wherein at least one sub-polychord of the plurality of sub-polychords comprises a contiguous sequence of edges of a corresponding polychord.

8. The method of claim 6, wherein at least one sub-polychord of the plurality of sub-polychords comprises an arbitrary set of edges of the polychord mesh.

9. The method of claim 6, wherein the metric represents a loss of mesh fidelity due to collapsing the sub-polychord.

10. The method of claim 6, wherein the metric comprises a quadric error term.

11. The method of claim 6, wherein the metric comprises a sum of quadric error terms associated with two or more vertices comprised by the candidate sub-polychord.

12. The method of claim 6, wherein the metric comprises a weighted sum of two or more terms.

13. The method of claim 6, wherein the metric comprises a valence term reflecting at least one of: a change of a vertex valence or a change of a face valence.

14. The method of claim 6, wherein the metric is provided by a ratio of a benefit of collapsing the candidate sub-polychord to a loss of mesh fidelity due to collapsing the candidate sub-polychord.

15. The method of claim 14, wherein the benefit of collapsing the candidate sub-polychord reflects at least one of: a number of edges to be removed from the polychord mesh by collapsing the sub-polychord or a number of vertices to be removed from the polychord mesh by collapsing the candidate sub-polychord.

16. The method of claim 6, wherein identifying the plurality of sub-polychords further comprises:
identifying a seed sub-polychord having a minimal value of the metric among the plurality of sub-polychords of a given size;
identifying a first test value of the metric for a first test sub-polychord comprising the seed sub-polychord and a first adjacent edge;
identifying a second test value of the metric for a second test sub-polychord comprising the seed sub-polychord and a second adjacent edge; and
responsive to determining that a minimum of the first test value of the metric and the second test value of the metrics is less than a base value of the metric for the seed sub-polychord, transforming the seed sub-polychord by adding an adjacent edge that produces a test sub-polychord having the minimum test value.

17. The method of claim 16, wherein adding the adjacent edge is performed iteratively, until determining that the minimum of the first value of the metric and the second value of the metric exceeds the base value of the metric.

18. The method of claim 16, wherein identifying the candidate sub-polychord further comprises:
responsive to determining that the minimum of the first value of the metric and the second value of the metric exceeds the base value of the metric, identifying the candidate sub-polychord as being equal to the seed sub-polychord.

19. A computer-readable non-transitory storage medium comprising executable instructions to cause a processing device to:
identify, by the processing device, a plurality of sub-polychords in a polychord mesh comprising one or more polychords;
identify, among the plurality of sub-polychords, a candidate sub-polychord having an optimal value of a metric associated with collapsing the respective sub-polychord, wherein the optimal value is provided by one of: a maximal value of the metric among a plurality of values of the metric associated with the plurality of sub-polychords or a minimal value of the metric among the plurality of values of the metric associated with the plurality of sub-polychords;
collapse the candidate sub-polychord by replacing a set of edges comprised by the candidate sub-polychord with a set of vertices, wherein collapsing the candidate sub-polychord further comprises replacing a quadrangle face at an end of the sub-polychord with a triangle; and
utilize the polychord mesh for creating computer-generated imagery.

20. The computer-readable non-transitory storage medium of claim 19, wherein identifying the plurality of sub-polychords further comprises:
identifying a seed sub-polychord having a minimal value of the metric among the plurality of sub-polychords of a given size;
identifying a first test value of the metric for a first test sub-polychord comprising the seed sub-polychord and a first adjacent edge;
identifying a second test value of the metric for a second test sub-polychord comprising the seed sub-polychord and a second adjacent edge; and
responsive to determining that a minimum of the first test value of the metric and the second test value of the metrics is less than a base value of the metric for the seed sub-polychord, transforming the seed sub-polychord by adding an adjacent edge that produces a test sub-polychord having the minimum test value.

* * * * *